United States Patent
Ravitz et al.

(10) Patent No.: US 6,359,640 B1
(45) Date of Patent: Mar. 19, 2002

(54) METHOD AND APPARATUS FOR MINIMIZING VISUAL ARTIFACTS RESULTING FROM LASER SCAN PROCESS DIRECTION POSITION ERRORS

(75) Inventors: Cary Patterson Ravitz; Thomas George Twardeck, both of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/560,549

(22) Filed: Apr. 28, 2000

(51) Int. Cl.7 .............................. B41J 2/435; B41J 2/385
(52) U.S. Cl. ...................... 347/234; 347/248; 347/116
(58) Field of Search ................................ 347/234, 235, 347/238, 248, 250, 41, 42, 37, 116

(56) References Cited

U.S. PATENT DOCUMENTS

| | | | |
|---|---|---|---|
| 4,253,102 A | 2/1981 | Kataoka et al. | 347/234 |
| 4,253,724 A | 3/1981 | Minoura et al. | 359/206 |
| 4,530,574 A | 7/1985 | Scifres et al. | 359/668 |
| 4,571,021 A | 2/1986 | Minoura et al. | 359/204 |
| 4,624,555 A | 11/1986 | Tokuhara et al. | 355/71 |
| 4,684,316 A | 8/1987 | Karlsson | 415/211.1 |
| 4,878,066 A | 10/1989 | Shiraishi | 347/235 |
| 5,052,767 A | 10/1991 | Sugata et al. | 359/206 |
| 5,194,952 A | 3/1993 | Pelley | 348/594 |
| 5,208,456 A | 5/1993 | Appel et al. | 250/216 |
| 5,251,055 A | 10/1993 | Jun Koide | 359/216 |
| 5,463,418 A | 10/1995 | Takeoka | 347/244 |
| 5,471,236 A | 11/1995 | Ito | 347/233 |
| 5,719,680 A | 2/1998 | Yoshida et al. | 358/296 |
| 5,737,006 A * | 4/1998 | Wong | 347/235 |
| 5,963,354 A | 10/1999 | Shiraishi et al. | 359/204 |

FOREIGN PATENT DOCUMENTS

| | | | |
|---|---|---|---|
| JP | 01-241444 | 9/1989 | B41J/3/00 |
| JP | 04-317254 | 11/1995 | H04N/1/23 |

* cited by examiner

*Primary Examiner*—Hai C. Pham
(74) *Attorney, Agent, or Firm*—John J. McArdle, Jr.; Michael T. Sanderson; Ronald K. Aust

(57) ABSTRACT

A method and apparatus provides for minimizing visual artifacts resulting from laser scan process direction position errors in an electrophotographic machine. The electrophotographic machine has a process direction, and includes a photoconductive member having an image forming surface having defined thereon a plurality of pixel locations which form a pixel grid, and wherein two adjacent pixels in the process direction are separated by a pixel spacing distance. A printhead unit has a first laser beam generator and a second laser beam generator, wherein the first laser beam generator generates a first laser beam which impinges the surface at a first location and the second laser beam generator generates a second laser beam which impinges the surface at a second location. The second location is spaced apart from the first location in the process direction by a separation distance equal to an integer multiple of the pixel spacing distance plus a distance less than the pixel spacing distance.

28 Claims, 4 Drawing Sheets

METHOD AND APPARATUS FOR MINIMIZING VISUAL ARTIFACTS RESULTING FROM LASER SCAN PROCESS DIRECTION POSITION ERRORS

BACKGROUND OF THE INVENTION

1. Field of the invention.

The present invention relates to an electrophotographic machine, and, more particularly, to a method and apparatus for minimizing visual artifacts resulting from laser scan process direction position errors.

2. Description of the related art.

In an in-line color electrophotographic imaging process, latent images are formed on a plurality of photosensitive drums, which are in turn developed using a predetermined color of toner. The developed images are then transferred to a sheet of media (such as paper) which travels past the drums. The image in each color is created one line at a time, and the lines are oriented at right angles to the direction of travel of the sheet of media. The individually-generated images combine to form a full-color image. In a typical multi-color laser printer, for example, the sheet of media passes through four color developing stations in series, with the colors being black, magenta, cyan and yellow.

It is recognized that in order for the multi-color laser printer to print accurately, the laser beams for all four colors must be in alignment, both in the scan direction (across the page) and the process direction (feed direction of the print medium). However, providing proper alignment of even a single laser printhead in relation to the sheet of media in the process direction can be difficult. This problem is compounded with the addition each printhead, since the plurality of printheads must be in registration so that the individual images generated by each printhead can be superimposed correctly when combined. During printer assembly an attempt is made to optically align the laser printheads both individually and collectively, but the ability to provide precise alignment is limited by several factors, including component tolerances. In addition, it is possible for a precisely aligned printing system to drift out of alignment due to component aging and/or the influences of printing environment factors, such as the internal temperature changes of the printer that cause distortion of the laser beam optical scan path.

What is needed in the art is a method and apparatus for minimizing visual artifacts resulting from laser scan process direction position errors, such as printhead skew and laser beam optical scan path distortion.

SUMMARY OF THE INVENTION

The present invention provides method and apparatus for minimizing visual artifacts resulting from laser scan process direction position errors, such as printhead skew and laser beam optical scan path distortion.

One aspect of the invention relates to an electrophotographic machine having a process direction. The electrophotographic machine includes a photoconductive member having an image forming surface having defined thereon a plurality of pixel locations which form a pixel grid, wherein two adjacent pixels in the process direction are separated by a pixel spacing distance. The electrophotographic machine also includes a printhead unit having a first laser beam generator and a second laser beam generator. The first laser beam generator generates a first laser beam which impinges the surface of the photoconductive member at a first location and the second laser beam generator generates a second laser beam which impinges the surface of the photoconductive member at a second location. The second location is spaced apart from the first location in the process direction by a separation distance equal to an integer multiple of the pixel spacing distance plus a distance less than the pixel spacing distance.

In one method for minimizing visual artifacts resulting from laser scan process direction position errors, error correction is provided by selectively operating the first laser beam generator and the second laser beam generator during a formation of a scan line on the surface of the photoconductive member.

An advantage of the present invention is that the scan path of the laser beams of a multicolor electrophotographic machine can be corrected for printhead skew and optical scan path distortion, both during and after an initial printhead alignment.

Another advantage of the invention is the ability to synthesize the position of spot formation on the photoconductive drum in the process direction.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
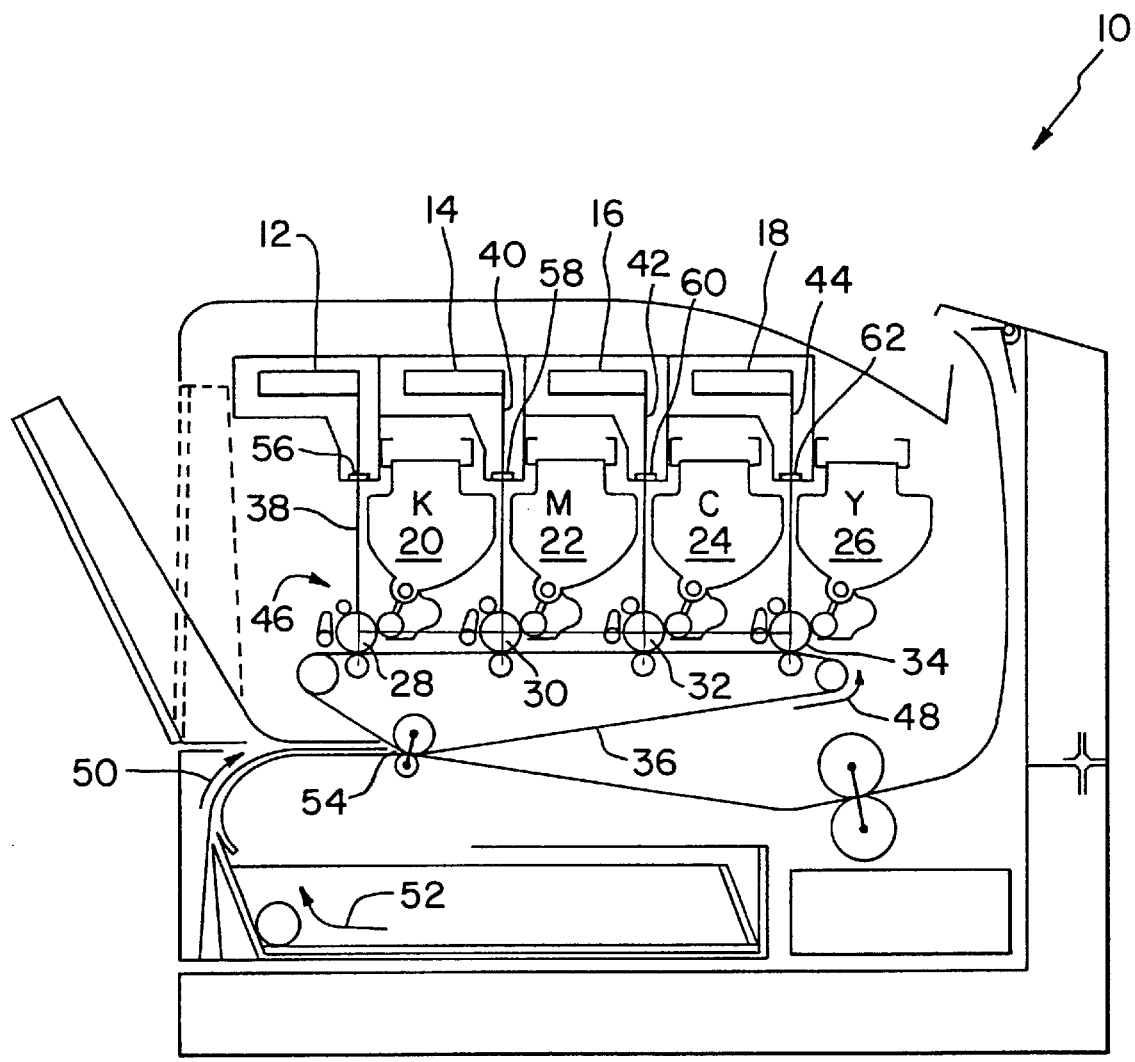
FIG. 1 is a side, sectional view of a multicolor laser printer embodying the present invention.

Referring now to the drawings and, more particularly, to FIG. 1, there is shown one embodiment of a multicolor laser printer 10 including laser printhead units 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser printhead units 12, 14, 16 and 18 scans a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged to approximately −900 volts and is subsequently discharged to a level of approximately −200 volts in the areas of its peripheral surface that are impinged by a respective one of laser beams 38, 40, 42 and 44 to form a latent image thereon made up of a plurality of dots, or spots. During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

Ideally, each of the plurality of dots is located at a corresponding pixel position located on an imaginary pixel grid on the photoconductive drum. Vertically adjacent pixels are separated in space by a distance in the process direction 46, which will be referred to herein as pixel spacing distance. For example, a printer having a vertical resolution of 600 dots per inch (d.p.i.) has a pixel spacing distance of $\frac{1}{600}$ths of an inch. If a printing system experiences laser scan process direction position errors, such as printhead skew and laser beam optical scan path distortion, however, the actual location of formation of the dot on the photoconductive drum deviates from the desired pixel location.

The toner in each of toner cartridges 20, 22, 24 and 26 is negatively charged and is conveyed by an electrically conductive roller. During the printing operation, the conveyance roller is biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −200 volts by the laser beams. As belt 36 rotates in the direction indicated by arrow 48, the toner from each of drums 28, 30, 32 and 34 is transferred to the outside surface of belt 36. As a print medium, such as paper, travels along either path 50 or duplexing path 52, the toner is transferred to the surface of the print medium in nip 54. Each of printhead units 12, 14, 16 and 18 includes a respective one of sensor devices 56, 58, 60 and 62, each of which is placed near the end of a scan line of the associated laser beam, and is used to determine an orientation of the laser printhead in the process direction.

If it is determined that printer 10 is generating an excessive number of visual artifacts as a result of laser scan process direction position errors, such as printhead skew and laser beam optical scan path distortion, then the correction method of the present invention is implemented, as is more fully described below.

Figure 2:
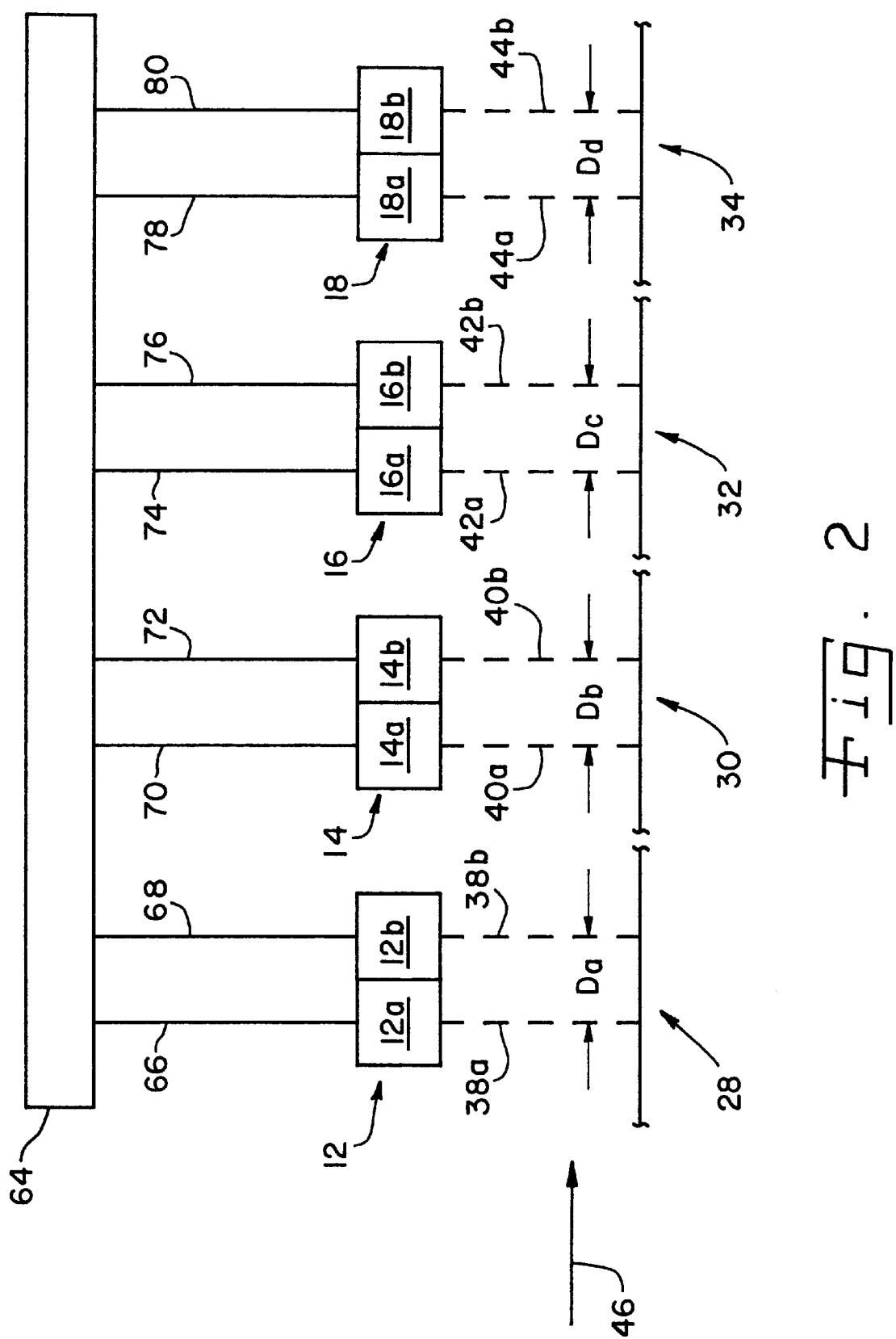
FIG. 2 is a block diagram illustrating the multi-beam printheads of the present invention.

As schematically illustrated in FIG. 2, each of laser printhead units 12, 14, 16, 18 include two independently controlled laser beam generators 12a, 12b; 14a, 14b; 16a, 16b; and 18a, 18b, respectively. Accordingly, sometimes laser printhead units 12, 14, 16, 18 will be referred to as multi-beam printheads. Although each laser printhead unit is shown to include two laser beam generators, it is within the scope of the invention to include additional laser beam generators in each laser printhead unit. Each of laser beam generators 12a, 12b; 14a, 14b; 16a, 16b; and 18a, 18b include associated optics, including a multi-faceted scanning mirror. Also, each of laser beam generators 12a, 12b; 14a, 14b; 16a, 16b; and 18a, 18b is connected to a printhead controller 64 via electrical conductors 66, 68, 70, 72, 74, 76, 78, 80, respectively. During operation, one or both of the two laser beam generators in each of the laser printhead units 12, 14, 16 and 18 may be actuated by printhead controller 64 at any time. Thus, each of the laser printhead units 12, 14, 16 and 18 scans a respective laser beam, generally referred to above as laser beams 38, 40, 42, 44, in a scan direction across a respective one of photoconductive drums 28, 30, 32 and 34. The actual point of impingement of each of the laser beams 38, 40, 42, 44 on the respective photoconductive drum 28, 30, 32 and 34 will depend, in part, upon which one of the two laser beam generators in each of laser printhead units 12, 14, 16 and 18 has been selected by printhead controller 64 to be the source of the beam, and whether both laser beam generators are selectably controlled to synthesize an intermediate dot position.

Each of the printhead units 12, 14, 16, 18 is designed so that the separation distance ($D_a$, $D_b$, $D_c$, $D_d$), in process direction 46 between the beam pairs 38a, 38b; 40a, 40b; 42a, 42b and 44a, 44b at the point of beam impingement on drums, 28, 30, 32, 34, respectively, is an integer multiple of the pixel spacing distance plus a distance less than the pixel spacing distance. Preferably, the separation distance is selected to be a distance corresponding to an integer multiple of the pixel spacing distance plus one-half the pixel spacing distance, such as for example, a distance of 1.5 times the pixel spacing distance. However, it is to be understood that the integer multiple can include a multiplier of 0, in which case the separation distance is less than the pixel spacing distance.

In other words, for example, each of printhead units 12, 14, 16, 18 is capable of generating a scan line having a first scan line portion and a second scan line portion offset from the first scan line portion by a distance including a sub-pixel spacing distance. As will be described in more detail below, this arrangement will be particularly advantageous for minimizing visual artifacts resulting from laser scan process direction position errors, such as printhead skew and laser beam optical scan path distortion, for each of printheads 12, 14, 16, 18.

Figure 3:
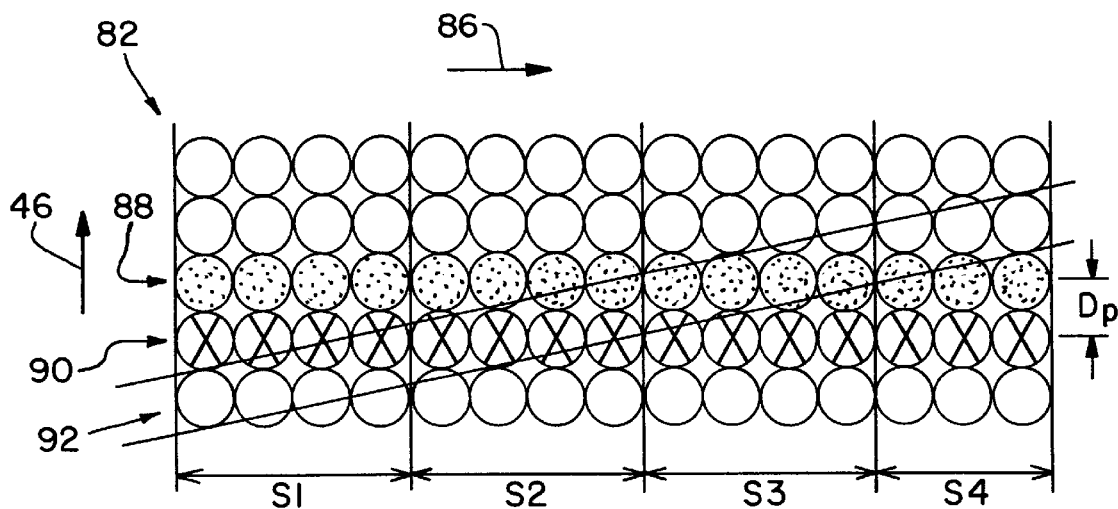
FIG. 3 graphically depicts an original bit map for one image plane, in relation to a skewed laser beam scan path.

FIG. 3 graphically illustrates an original bit map of image plane 82, i.e., pixel grid, of one of the black, cyan, magenta and yellow image planes of multicolor laser 10. Original bit map 82 of image plane 82 includes a plurality of rows and a plurality of columns of pixel locations to be developed on an associated photoconductive drum. The open circles depict pixels that will not be printed. Each of the columns of pixel locations illustratively represents a printable portion of the image plane that extends in process direction 46. Each row of potential pixel locations illustratively represent a printable portion of the image plane which is to be scanned across the width of the associated photoconductive drum in a scan direction depicted by arrow 86, which is ideally perpendicular to the process direction 46. In the illustration of FIG. 3, the pixels which are actually to be printed are depicted by darkened circles and by circles with an "X" therein (hereinafter Xed pixels). The darkened pixels are located along row 88 of the original bit map of image plane 82 and the Xed pixels are located along row 90 of the original bit map of image plane 82. The distance $D_p$ between row 88 and row 90, for example, is what has been referred to herein as the pixel spacing distance. Thus, the development of the associated one of photoconductive drums 28, 30, 32, 34 containing the original bit map of image plane 82 would ideally result in a horizontal line two pixels wide which extends across the width of the associated photoconductive drum perpendicular to process direction 46.

FIG. 3 further graphically illustrates a scan path 92 for an associated one of laser beams 38, 40, 42, 44. Scan path 92 is shown to overlie the original bit map of image plane 82, and extends generally diagonally across four rows of the original bit map of image plane 82. Since the orientation of scan path 92 does not correspond exactly to the orientation of the rows of image plane 82, scan path 92 is said to be skewed. The skewed path 92 corresponds to a laser beam path which would be traveled as a result of a skewed printhead which is in need of skew correction. As illustrated in FIG. 3, the skew angle of scan path 92 is positive, and requires negative skew correction.

Figure 4:
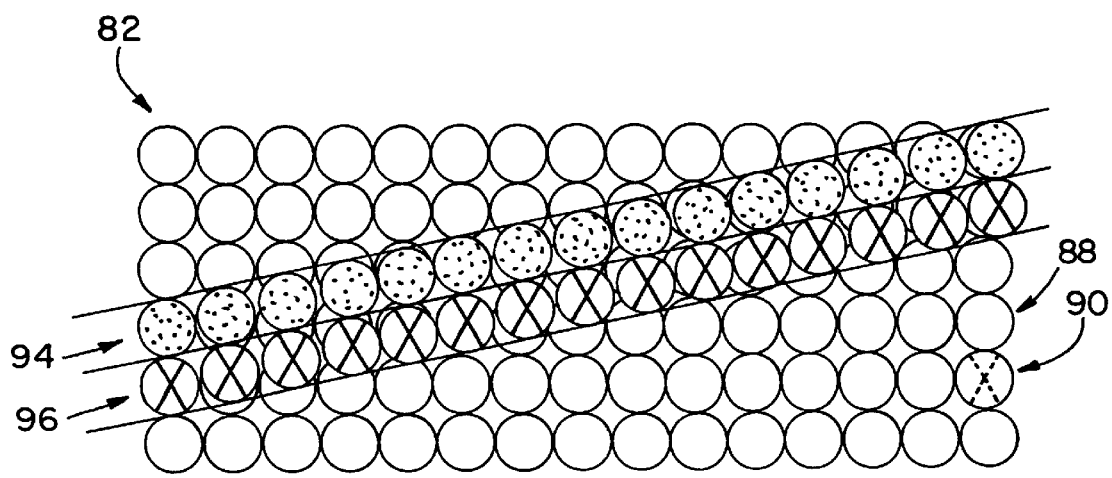
FIG. 4 graphically illustrates the results of printing the data of the original bit map of FIG. 3 along the skewed laser beam path.

FIG. 4 graphically illustrates the results of scanning the data of rows 88 and 90 of the original bit map of image plane 82 onto the associated one of photoconductive drums 28, 30, 32, 34 with a skewed printhead along the scanlines 94 and 96. Scan lines 94, 96 have an orientation which correspond to the orientation of scan path 92 of FIG. 3. As shown in FIG. 4, the amount of skew can be described in terms of the maximum deviation of a printed pixel position from the intended pixel position. For example, in the illustration of FIG. 4, the right-most dots of scan lines 94, 96 are off-set from the intended pixel positions at rows 88, 90 of image plane 82 by a distance corresponding to 3 times $D_p$, or 3 pixel spacings. Thus, the skewed printhead is said to have a skew of 3.

If, for example, printhead unit 12 is skewed as illustrated in FIG. 4, and printhead units 14, 16, 18 are aligned to exactly print an original bit map of the corresponding cyan, magenta and yellow image planes, then the orientation of printhead 12 cannot be registered with the orientation of printhead units 14, 16, 18. As a result, the individual images generated by each of printhead units 12, 14, 16, 18 will not be superimposed correctly when combined. Accordingly, it is desirable to perform skew correction of printhead unit 12 so that the data printed by the skewed printhead unit 12 will be more closely aligned with the intended pixel positions of the original bit map of image plane 82. In implementing the correction method of the invention, the scan path of a skewed printhead will not be physically changed. Rather, the scan path is virtually changed electronically by changing the order in which print data is supplied to the skewed printhead. Thus, to correct printhead skew, the present invention generates a modified bitmap image from the original bit map image of original image plane 82, and the modified bitmap image is used to control the operation of the skewed printhead 12.

Each of printhead units 12, 14, 16, 18 is substantially identical in structure. Accordingly, to simplify the discussion and for ease of understanding the invention, only the structure of printhead unit 12 will be described in detail below in relation to FIGS. 5 and 6. However, it is to be understood that the discussion that follows with respect to printhead unit 12 also applies to each of printhead units 14, 16, and 18.

Figure 5:
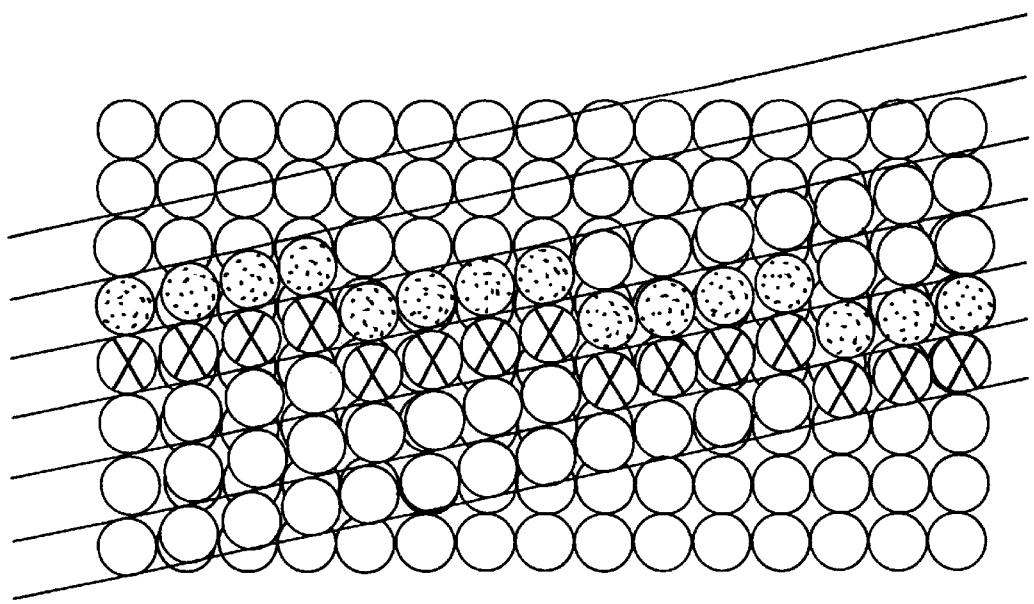
FIG. 5 graphically illustrates the results of implementing the skew correction method of the invention when only one beam of the multi-beam printhead is used in printing a skew correction bit map.

FIG. 5 graphically illustrates the results of implementing the skew correction method of the invention if only one beam of the multi-beam printhead is available for use. The method of the present invention first determines the magnitude of the skew in pixel spacings. As illustrated in FIG. 4, the skew magnitude (SM) of the present example is 3. Therefore, the original bit map of image plane 82 must be shifted by an amount of up to 3 pixel spacings in order to more closely correspond to the intended pixel positions. To correct the skew of the printhead unit 12, each row of the original bit map of image plane 82 is divided into a number of segments greater than the magnitude of the skew. For example, the total number of segments (SG) is determined by the formula: SG=SM+1. Once the rows of the original bit map of image plane 82 are segmented (see FIG. 3), then it is determined whether to shift the data within a given segment to a new row by a predetermined correction factor (CF).

Referring now to FIGS. 3 and 4 in relation to FIG. 5, it can be seen that for a skew magnitude SM=3, the rows of original image plane 82 are segmented into 4 segments (SG=4). Referring to FIG. 5, in forming a skew correction bit map for printhead unit 12, the data corresponding to segment S1 of the bit map data of original image plane 82 is not shifted (CF=0); in segment S2, the bit map data of the original bit map of image plane 82 is shifted by one row (CF=1); in segment S3 the bit map data of the original bit map of image plane 82 is shifted by two rows (CF=2); and in segment S4 the bit map data of the original bit map of image plane 82 is shifted by three rows (CF=3).

In an actual printer, such as a Lexmark color laser printer, the raster image processor (RIP) software divides the rows of the original bit map image of each color plane into 10 blocks (i.e. segments) of data. Since the skew correction method described above permits a maximum skew magnitude SM of one less than the number of segments SG (i.e., SM=SG−1), the current Lexmark block arrangement permits a maximum skew correction of nine (SM=9) in implementing the method described above. The correction factor CF for a given skew magnitude (SK=1 to 9) for each of the blocks (S=1 to 10) can be acquired by the formula:

$$CF(SK, S)=(SW*(S-1))/(SL/(SK+1)), \text{ rounded down to the nearest integer,}$$

wherein:
SW is the width of each block (segment) in dots per inch;
S is the number of the block (segment) under consideration;
SL is the scan length of a full row of original bit map in dots per inch; and
SK is the skew magnitude (integer number of pixel spacings).

The formula set forth above could be executed in real time to provide skew correction, as needed, to each bit of the original bit map in generating a modified bit map with skew correction. However, a more efficient approach is to use the formula above to generate a lookup table (see, Table 1 below) which includes the values for skew correction factor CF for each combination of skew magnitude (S=1 to 9) block (S=1 to 10).

TABLE 1

Skew Correction Factors

| Magnitude Of Skew | SEGMENT | | | | | | | | | |
|---|---|---|---|---|---|---|---|---|---|---|
| (SK) | S1 | S2 | S3 | S4 | S5 | S6 | S7 | S8 | S9 | S10 |
| 0 | 0 | 0 | 0 | 0 | 0 | 0 | 0 | 0 | 0 | 0 |
| 1 | 0 | 0 | 0 | 0 | 0 | 1 | 1 | 1 | 1 | 1 |
| 2 | 0 | 0 | 0 | 0 | 1 | 1 | 1 | 2 | 2 | 2 |
| 3 | 0 | 0 | 0 | 1 | 1 | 2 | 2 | 2 | 3 | 3 |
| 4 | 0 | 0 | 1 | 1 | 2 | 2 | 3 | 3 | 4 | 4 |
| 5 | 0 | 0 | 1 | 1 | 2 | 3 | 3 | 4 | 4 | 5 |
| 6 | 0 | 0 | 1 | 2 | 2 | 3 | 4 | 4 | 5 | 6 |
| 7 | 0 | 0 | 1 | 2 | 3 | 4 | 4 | 5 | 6 | 7 |
| 8 | 0 | 0 | 1 | 2 | 3 | 4 | 5 | 6 | 7 | 8 |
| 9 | 0 | 1 | 2 | 3 | 4 | 5 | 6 | 7 | 8 | 9 |

Alternatively, the lookup table could be generated using empirical data, or by using predicted values. Also, while the example given above was directed to correcting for printhead skew, it is to be understood that the values in the lookup table can be generated to compensate for laser beam optical scan path distortion, one form of which being commonly referred to as bowing. Also, the lookup table could include values to compensate for both printhead skew and laser beam optical scan path distortion.

The above method is directed to a situation in which only one beam of a multi-beam printhead is available for use in correcting laser scan process direction position errors. However, if the second beam of the multi-beam printhead is available for use in such error correction, then even better error correction results can be obtained, as shown in FIG. 6.

Figure 6:
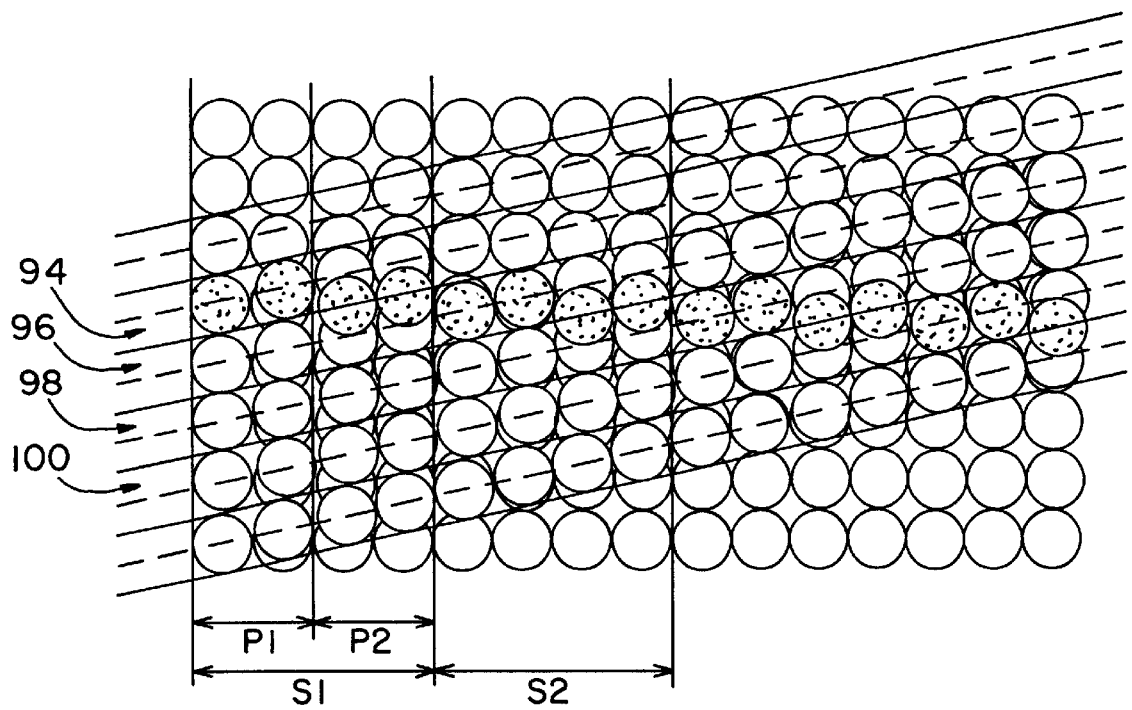
FIG. 6 graphically illustrates the results of implementing the skew correction method of the invention when two beams of the multi-beam printhead are used in printing the skew correction bit map.

FIG. 6 graphically illustrates the results of implementing the laser scan process direction position error correction method of the invention when two beams of the multi-beam printhead are used in printing error corrected print data. As stated above, the separation distance between the two beams of each of the printhead units 12, 14, 16, 18, is selected to be a distance corresponding to an integer multiple of the pixel spacing distance plus a distance less than the pixel spacing distance, and preferably, is a distance corresponding to an integer multiple of the pixel spacing plus a one-half pixel spacing distance, such as for example, a distance of 1.5 times the pixel spacing distance.

Again, using printhead unit 12 as an example, by selectively operating laser beam generator 12a and then operating laser beam generator 12b of the multi-beam printhead unit 12 during the transfer of a error correction bit map block to photoconductive drum 28, the resolution of the error correction in the process direction is enhanced. For example, as shown in FIG. 6, to correct for a positive skew angle, a first portion P1 of scan line 94 of a block (or segment) S1 of data is formed by laser beam generator 12a and a remaining portion P2 of scan line 94 of the block is formed by laser beam generator 12b, but offset by a distance of one-half pixel spacing. This pattern continues for scan lines 96, 98 and 100. To correct for a negative skew angle, the order of operating laser beam generators 12a, 12b is reversed so that laser beam generator 12b is operated during a first portion of the scan line, and then laser beam generator 12a is operated during a remainder of the scan line.

The relationship between the length of first portion P1 and the length of remaining portion P2 may be defined by a ratio P1:P2, and this ratio can be based on empirical data, such as measuring test patterns on print samples. The ratio is then stored in a memory of printer controller 64, which in turn controls the operation of each laser beam generator of the affected printhead unit based on the ratio. Alternatively, printhead controller 64 can be programmed to analyze the data to be printed, and then select the desired ratio to be applied for the printing each block of a scan line.

A separate ratio may be determined and applied to each block (segment) of the skew correction bit map. Alternatively, some of the blocks may be identified as a group, wherein a separate ratio is used for each group of a plurality of groups. Of course, a single ratio may be applied to all the blocks of a scan line.

As shown in FIG. 6, for example, highly desirable results can be achieved when the ratio is selected to be 1, i.e., 2:2, wherein the operation duration of each laser beam generator of the effected printhead unit is operated for one-half of the duration of the selected block. However, other ratios not equal to zero are possible. For example, a ratio of 1:2 will result in an operation duration of the second laser beam generator being twice as long as the operation duration of the first laser beam generator.

The dual laser method described above can be further enhanced by controlling the printhead so that both laser generators are energized at reduced power at a location associated with a particular pixel location to form a dot at a location intermediate of the dot positions which would otherwise be formed by the two laser generators individually. Again, with reference to printhead unit 12 as an example, since the spacing between beam pairs 38a, 38b include a sub-pixel spacing factor, the energizing of the two laser beam generators 12a, 12b at a position associated with the particular pixel location tends to form two overlapping dots. However, by reducing the energy supplied to the two laser beam generators 12a, 12b forming the beam pair 38a, 38b, the concentration of energy at the location where the two beam dots overlap is increased to an energy level approaching that of a dot formed by a single laser generator operating at its full energy level. Accordingly, the synthesized dot lies at a location in the process direction between the paths scanned by the beam pair 38a, 38b, which can even more closely correspond to the desired pixel location on the photoconductive drum.

Accordingly, if for example, multicolor laser printer 10 is adapted for 1200 d.p.i. printing, the present invention can provide 1200 d.p.i. full speed printing and 1200 d.p.i. laser scan process direction position error correction. In addition, however, by synthesizing the dot location by using dual laser beams, the present invention can provide 1200 d.p.i. full speed printing with 2400 d.p.i. synthesized laser scan process direction position error correction.

The present invention has been described herein as being used in conjunction with a laser printer. However, it is to be understood that it is possible for the present invention to be adapted for use in conjunction with other types of electrophotographic imaging apparatus, such as a copier machine. Also, it is to be understood that the method and apparatus of the present invention for minimizing visual artifacts resulting from laser scan process direction position errors may be further enhanced by the adding of additional laser beam generators to each printhead unit. Still further, while the invention has been described with respect to using dual parallel beams from a single printhead, the invention also applies to dual beams generated by two or more independent laser printheads.

While this invention has been described as having a preferred design, the present invention can be further modified within the spirit and scope of this disclosure. This application is therefore intended to cover any variations, uses, or adaptions of the invention using its general principles. Further, this application is intended to cover such departures from the present disclosure as come within know or customary practice in the art to which this invention pertains and which falls within the limits of the appended claims.

What is claimed is:

1. An electrophotographic machine having a process direction, comprising:

a photoconductive member having an image forming surface having defined thereon a plurality of pixel locations which form a pixel grid, and wherein two adjacent pixels in said process direction are separated by a pixel spacing distance;

a printhead unit having a first laser beam generator and a second laser beam generator, wherein said first laser beam generator generates a first laser beam which impinges said surface at a first location and said second laser beam generator generates a second laser beam which impinges said surface at a second location, said second location being spaced apart from said first location in said process direction by a separation distance equal to an integer multiple of said pixel spacing distance plus a distance less than said pixel spacing distance.

2. The electrophotographic machine of claim 1, wherein said distance less than said pixel spacing distance is one-half of said pixel spacing distance.

3. The electrophotographic machine of claim 1, wherein said integer multiple is equal to 0.

4. The electrophotographic machine of claim 1, wherein said integer multiple is not equal to 0.

5. The electrophotographic machine of claim 1, further comprising a printhead controller which is configured to selectively operate said first laser beam generator and said second laser beam generator during a formation of a first scan line on said surface.

6. The electrophotographic machine of claim 5, wherein said first scan line is divided into a plurality of segments, and wherein a first portion of a first segment of said plurality of segments is formed on said surface by said first laser beam of said first laser beam generator and a remaining portion of said first segment is formed by said second laser beam of said second laser beam generator.

7. The electrophotographic machine of claim 6, wherein said printhead controller includes a lookup table having values for effecting a timing of energizing said first laser beam generator and said second laser beam generator for minimizing visual artifacts resulting from laser scan process direction position errors associated with said printhead unit.

8. The electrophotographic machine of claim 7, wherein said values are determined empirically.

9. The electrophotographic machine of claim 7, wherein said values are determined by prediction.

10. The electrophotographic machine of claim 6, wherein a length of said first portion and a length of said remaining portion form a ratio which is not equal to zero.

11. The electrophotographic machine of claim 10, wherein said ratio is equal to 1.

12. The electrophotographic machine of claim 6, wherein said printhead controller calculates a plurality of correction factors to be applied to said plurality of segments for minimizing visual artifacts.

13. The electrophotographic machine of claim 12, wherein said printhead controller stores said calculated plurality of correction factors in a lookup table.

14. The electrophotographic machine of claim 6, wherein a length of said first portion and a length of said remaining portion form a ratio which is not equal to one.

15. A unit for minimizing visual artifacts resulting from laser scan process direction position errors in an electrophotographic machine, said electrophotographic machine including a photoconductive member having an image forming surface having defined thereon a plurality of pixel locations which form a pixel grid, and wherein two adjacent pixels in a process direction are separated by a pixel spacing distance, said unit comprising:

a first laser beam generator that generates a first laser beam which impinges said surface at a first location; and a second laser beam generator that generates a second laser beam which impinges said surface at a second location, said second location being spaced apart from said first location in said process direction by a separation distance equal to an integer multiple of said pixel spacing distance plus a distance less than said pixel spacing distance.

16. The unit of claim 15, wherein said distance less than said pixel spacing distance is one-half of said pixel spacing distance.

17. The unit of claim 15, wherein said integer multiple is equal to 0.

18. The unit of claim 15, wherein said integer multiple is not equal to 0.

19. The unit of claim 15, further comprising a printhead controller which is configured to selectively operate said first laser beam generator and said second laser beam generator during the forming of a first scan line on said photoconductive member.

20. The unit of claim 15, wherein printhead controller includes a lookup table having values for effecting a timing of said generating said first laser beam and said generating said second laser beam.

21. A method for minimizing visual artifacts resulting from laser scan process direction position errors in an electrophotographic machine, said electrophotographic machine including a photoconductive member having an image forming surface, said method comprising the steps of:

defining with respect to said surface thereon a plurality of pixel locations which form a pixel grid, wherein two adjacent pixels in said process direction are separated by a pixel spacing distance generating a first laser beam which impinges said surface at a first location; and generating a second laser beam which impinges said surface at a second location, said second location being spaced apart from said first location in said process direction by a separation distance equal to an integer multiple of said pixel spacing distance plus a distance less than said pixel spacing distance.

22. The method of claim 21, further comprising the steps of:

providing a first laser beam generator for performing the first generating step;

providing a second laser beam generator for performing the second generating step; and selectively operating said first laser beam generator and said second laser beam generator during a formation of a first scan line on said surface.

23. The method of claim 22, further comprising the step of generating a lookup table having values for effecting a timing of said generating said first laser beam and said generating said second laser beam.

24. The method of claim 22, further comprising the steps of:

dividing said first scan line into a plurality of segments;

dividing a first segment of said plurality of segments into a first portion and a second portion;

operating said first laser beam generator during said first portion of said first segment; and operating said second laser beam generator during said second portion of said first segment.

25. The method of claim 24, further comprising the step of selecting a ratio of said first portion and said second portion.

26. The method of claim 24, further comprising the step of selecting a ratio of said first portion and said second portion that is equal to 1.

27. The method of claim 24, further comprising the step of selectively operating said first laser beam generator and said second laser beam generator in each of said plurality of segments during a formation of said first scan line of said plurality of scan lines.

28. The method of claim 22, further comprising the step of operating said first beam generator and said second laser beam generator to synthesize a dot at a location on said photoconductive member intermediate of a scan path of said first laser beam and a scan path of said second laser beam.

* * * * *